Patented Aug. 18, 1925.

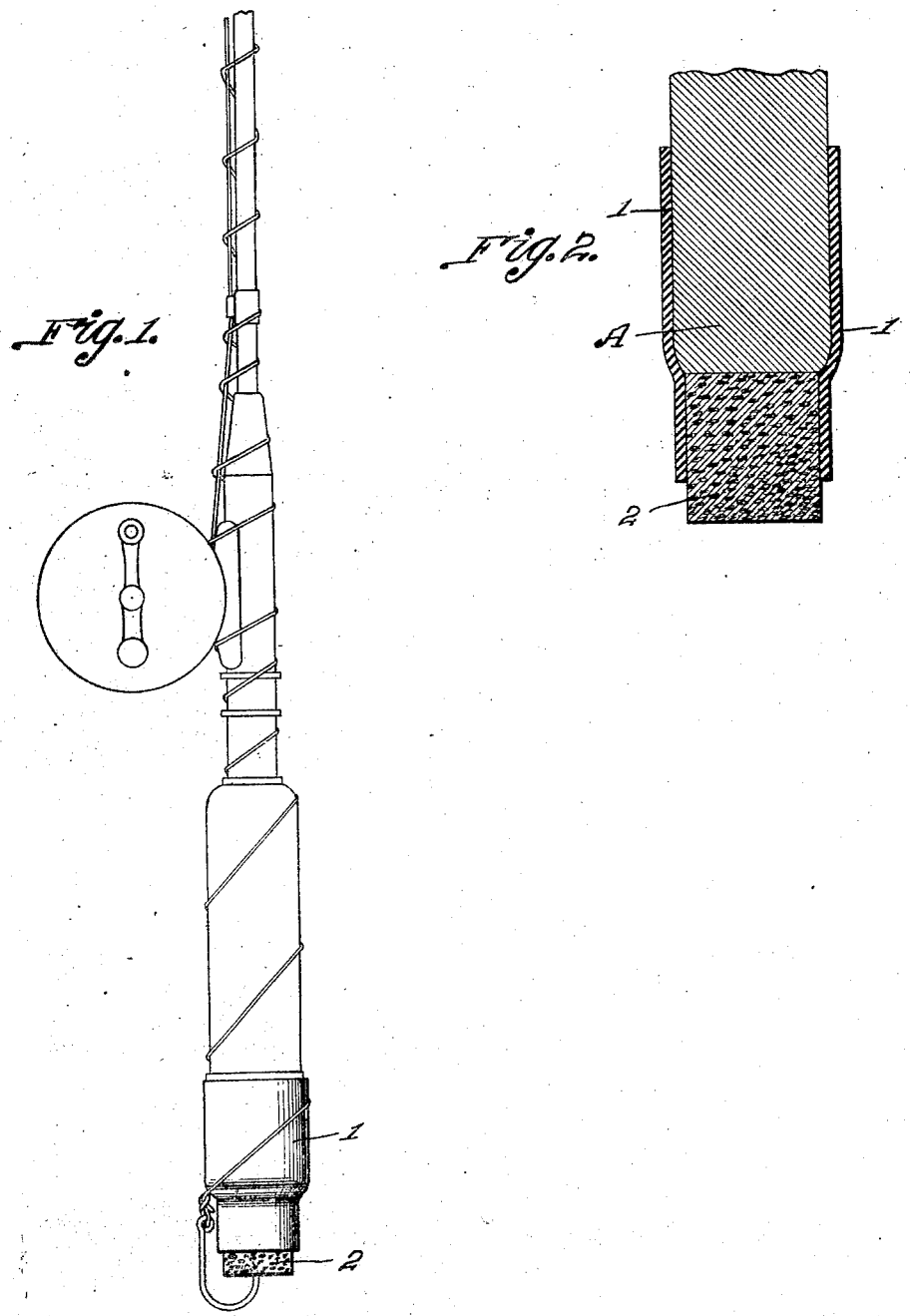

1,550,080

UNITED STATES PATENT OFFICE.

JOHN A. LEHRRITTER, OF CINCINNATI, OHIO.

ATTACHMENT FOR FISHING RODS.

Application filed November 3, 1923. Serial No. 672,585.

*To all whom it may concern:*

Be it known that I, JOHN A. LEHRRITTER, a citizen of the United States, residing at Cincinnati, in the county of Hamilton and State of Ohio, have invented new and useful Improvements in Attachments for Fishing Rods, of which the following is a specification.

This invention relates to an attachment for fishing rods, the general object of the invention being to provide means for holding the hooks at the end of the rod with the line twisted around the rod so that the rod can be easily transported or stored without winding the line upon the reel or removing it from the rod.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a view of a fishing rod with my invention in use.

Figure 2 is a sectional view of one end of the rod with the attachment thereon.

In these views, 1 indicates a ferrule which is preferably formed of rubber, which is slipped over the butt A of the rod. A block 2 of cork or the like is held by the ferrule in such a position that the hooks can be inserted therein with the line wrapped around the holder, as shown in Figure 1, so that there is no danger of the line becoming entangled in the brush or the like when going from one fishing place to another. This also permits the rod to be stored without necessitating the removal of the line or the winding thereof upon the reel. Instead of using cork, I may use other material which permits a hook to be placed therein and easily removed therefrom.

This invention provides a ready means of holding the line and hook on a fishing pole without danger of getting the line entangled in objects so that a fisherman can move from one fishing hole to another without having to wind up his line and detaching his hooks.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

An attachment for a fishing rod comprising a ferrule of rubber adapted to have a portion pressed over the butt of the rod and a block of cork in the outer end of the ferrule and abutting the end of the rod for holding the hooks when the same are not in use.

In testimony whereof I affix my signature.

JOHN A. LEHRRITTER.